Feb. 15, 1966  M. B. HOLLANDER  3,234,643
FRICTION WELDING
Filed May 24, 1962

INVENTOR
MILTON BERNARD HOLLANDER
BY

ATTORNEY

United States Patent Office 3,234,643
Patented Feb. 15, 1966

3,234,643
FRICTION WELDING
Milton Bernard Hollander, Stamford, Conn., assignor to American Machine & Foundry Company, a corporation of New Jersey
Filed May 24, 1962, Ser. No. 197,537
6 Claims. (Cl. 29—470.3)

This invention relates in general to friction welding and, more particularly, to the control of upset formed during the friction welding of metal workpieces.

When dissimilar metals are friction welded, if one workpiece has a lower melting temperature or a lower hot strength, it may soften and start to flow before the other. This premature softening of one workpiece will result in excessive upset or it may make it difficult or even impossible to weld certain combinations of metals. Even when two similar metal workpieces having a low hot strength are friction welded, excessive upset may result.

It is, therefore, an object of this invention to control the amount of upset produced when workpieces of dissimilar metals are friction welded.

Another object of this invention is to control the upset produced when a workpiece having a low hot strength is friction welded.

A further object of this invention is to cool or supercool a workpiece having a lower hot strength to control the amount of upset produced.

An additional object of this invention is to provide a superior friction welding technique for dissimilar metals.

Many other objects, advantages and features of invention may be found in this invention and its practice as will be described in the following specification and the accompanying drawing wherein.

Figure 1:
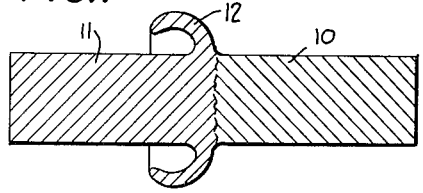
FIGURE 1 is a longitudinal section through two workpieces of dissimilar metals which have been conventionally friction welded.

Referring to the drawing, FIGURE 1 shows two workpieces 10 and 11 after they have been conventionally friction welded together, to accomplish the conventional friction welding of these workpieces, workpiece 10, which may be of copper, is rapidly rotated while workpiece 11, which may be of aluminum, is pressed against it. This relative rotation is rapidly stopped when sufficient heat is generated by friction in the contact or weld area to bond or weld the workpieces as they are continued to be pressed together.

As shown in FIGURE 1, the lower melting aluminum workpiece 11 melts before the copper workpiece 10 to throw off the relatively large upset 12. This large upset must be machined from the welded workpiece in most applications. In any case, the relatively large upset from the lower melting workpiece results in a waste of material. With some combinations of metals, conventional friction welding techniques will not weld or will only produce welds which are too weak to be satisfactory.

Figure 2:
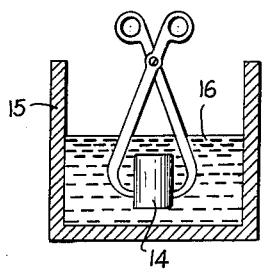
FIGURE 2 is a section through a tank containing a very cold volatile liquid within which a workpiece is immersed.
Figure 3:
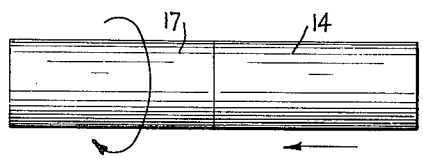
FIGURE 3 is a side view of two workpieces being friction welded.

As shown in FIGURE 2, a workpiece 14 according to this invention, is immersed in a tank 15 of a suitable cold volatile liquid 16 such as liquid air, liquid nitrogen, or the like. After a few seconds, the aluminum workpiece 14 is thoroughly supercooled after which it is quickly placed in the stationary or rotating chuck of a conventional friction welding machine (not shown) and friction welded to a copper workpiece 17.

Figure 4:
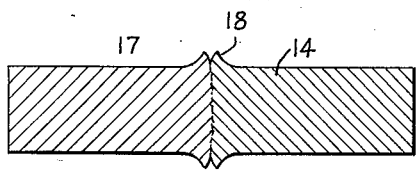
FIGURE 4 is a longitudinal section through two workpieces of dissimilar metals after they have been friction welded according to this invention.

As shown in FIGURE 4, the supercooling of a workpiece having a lower melting temperature or a lower hot strength serves to prevent the plastic flow of metal adjacent to the weld area and to control the formation of the upset 18.

Figure 5:
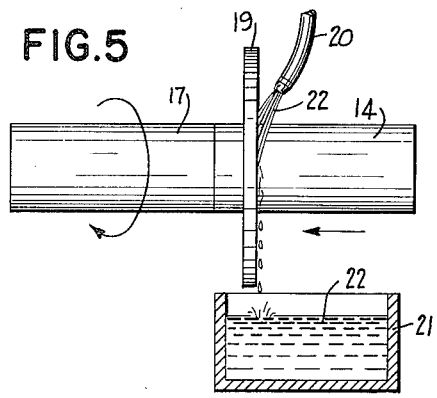
FIGURE 5 is a side view of two workpieces being friction welded with the stationary workpiece being liquid cooled.

Referring now to FIGURE 5, a disk 19 of a high temperature resisting plastic or the like is fixed about or placed about the lower melting metal workpiece 14 close to the weld area. A nozzle 20 directs a suitable stream of coolant 22, such as water or a cold gas, onto the metal workpiece 14 immediately behind the disk 19. The disk 19 serves to prevent the coolant from reaching the weld area and also cooling the higher melting metal workpiece 17. It is more desirable to cool the stationary workpiece so that the coolant may be conveniently collected in a trough 21 if a liquid. If the rotating workpiece is cooled, it will throw liquid coolant about and make the problem of its collection more difficult.

Referring again to FIGURE 4, the cooling of a lower melting workpiece can successfully control the amount of upset 18 which is produced. A higher temperature coolant may be used if the cooling continues during the actual friction welding process.

If similar metal workpieces having a low hot strength are friction welded, an excessive upset may result. This can be controlled if the workpieces are supercooled before being friction welded.

What is claimed is:

1. In the friction welding of metal workpieces the step of supercooling at least one workpiece prior to friction welding the workpieces; thereafter relatively rotating the workpieces in contact to heat said workpieces to a welding temperature by friction and continuing to cool said one workpiece during friction application to control upset.

2. In the friction welding of metal workpieces having different melting temperatures the step of supercooling the workpiece having the lower melting temperature prior to friction welding the workpieces; thereafter relatively rotating the workpieces in contact to heat said workpieces to welding temperature by friction and cooling said lower melting workpiece during friction application to control upset.

3. The process of friction welding metal workpieces having different melting temperatures comprising the steps of:
   (a) flowing a coolant fluid near the end of the lower melting workpiece,
   (b) relatively rotating the workpieces; forcing them together; cooling said lower melting workpiece during rotation, and
   (c) rapidly stopping the relative rotation of the workpieces and continuing to force them together to friction weld the workpieces, said cooling avoiding excessive deformation.

4. The process of friction welding metal workpieces having different melting temperatures comprising the steps of:
   (a) placing a barrier near the end of the workpiece having the lower melting temperature.
   (b) flowing a coolant fluid on the lower melting workpiece behind the barrier,
   (c) relatively rotating the workpieces; forcing them together, cooling said lower melting workpiece during rotation, and
   (d) rapidly stopping the relative rotating of the workpieces and continuing to force them together to friction weld the workpieces.

5. The process according to claim 4 wherein the coolant is water.

6. The process of friction welding metal workpieces having different melting temperatures comprising the steps of:
- (a) placing a barrier about the workpiece having the lower melting temperature near the end of the workpiece,
- (b) flowing a coolant on the workpiece having the lower melting temperature behind the barrier,
- (c) rotating the higher melting temperature workpiece; forcing the workpieces together, cooling said lower melting workpiece during rotation, and
- (d) rapidly stopping the rotation of the higher melting workpiece while continuing to force the workpieces together to friction weld the workpieces.

References Cited by the Examiner

UNITED STATES PATENTS

| | | | |
|---|---|---|---|
| 2,293,523 | 8/1942 | Warren | 219—104 |
| 2,325,113 | 7/1943 | Craig | 29—487 XR |
| 2,744,039 | 5/1956 | Siegel | 29—498 XR |
| 2,795,039 | 6/1957 | Hutchins | 29—470.3 |
| 2,824,818 | 2/1958 | Swenson | 29—487 XR |
| 2,862,294 | 12/1958 | Philip | 29—487 |
| 3,060,563 | 10/1962 | Berg | 29—487 |

OTHER REFERENCES

Zvaracsky Sbornik, Sav VI, 3-Bratislava, 1957, page 332.

Friction Welding of Metals by Vill', pages 56 and 57, published June 25, 1959.

WHITMORE A. WILTZ, *Primary Examiner.*

JOHN F. CAMPBELL, *Examiner.*